United States Patent
Eo et al.

(10) Patent No.: US 7,274,317 B2
(45) Date of Patent: Sep. 25, 2007

(54) TRANSMITTER USING VERTICAL BJT

(75) Inventors: Yun-seong Eo, Suwon-si (KR); Il-ku Nam, Seoul (KR); Sung-jae Jung, Seoul (KR); Kwy-ro Lee, Daejeon (KR); Heung-bae Lee, Suwon-si (KR); Kyu-don Choi, Seoul (KR); Joon-hee Lee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/432,341

(22) Filed: May 12, 2006

(65) Prior Publication Data

US 2006/0279444 A1 Dec. 14, 2006

(30) Foreign Application Priority Data

Jun. 9, 2005 (KR) ............... 10-2005-0049498

(51) Int. Cl.
*H03M 1/00* (2006.01)

(52) U.S. Cl. .................................... 341/133; 341/144
(58) Field of Classification Search ............. 341/133, 341/144; 330/258, 259, 261, 296
See application file for complete search history.

(56) References Cited

U.S. PATENT DOCUMENTS

| | | | | |
|---|---|---|---|---|
| 5,767,551 A | * | 6/1998 | Smayling et al. | ............ 257/370 |
| 5,969,561 A | * | 10/1999 | McGillan | ..................... 327/308 |
| 6,750,715 B2 | * | 6/2004 | Allott et al. | ................ 330/258 |
| 6,977,426 B1 | * | 12/2005 | Gomi et al. | ................ 257/553 |

* cited by examiner

*Primary Examiner*—Brian Young
(74) *Attorney, Agent, or Firm*—Sughrue Mion, PLLC

(57) ABSTRACT

A transmitter having a vertical BJT, capable of reducing power consumption, carrier leakage of a local oscillator and an error vector magnitude (EVM), is disclosed. In the transmitter, vertical BJTs implemented by a standard triplex well CMOS process are used in a frequency up-mixer and a baseband analog circuit including a DAC, an LPF, a VGA and a PGA, thereby improving the overall performance of the transmitter.

12 Claims, 8 Drawing Sheets

TRANSMITTER USING VERTICAL BJT

This application claims priority from Korean Patent Application No. 10-2005-0049498, filed on Jun. 9, 2005 in the Korean Intellectual Property Office, the entire contents of which are incorporated herein by reference.

BACKGROUND OF THE INVENTION

1. Field of the Invention

The present invention relates to a transmitter using a vertical bipolar junction transistor (BJT), and more particularly to a transmitter using a BJT which can improve the junction characteristic between elements and solve a direct current (DC) offset problem by replacing at least a part of circuit elements with vertical BJTs.

2. Description of the Related Art

Currently, since complementary metal-oxide-Semiconductor (CMOS) technology has a high degree of integration as the chip size decreases, CMOS is the best technology that is used to implement a System-on-Chip (SoC). Better radio frequency (RF) performance is obtained as the chip size becomes smaller.

A direct conversion transmitter as well as a direct conversion receiver facilitates a digital circuit implementation, and particularly has a structure suitable for manufacturing a single chip using a CMOS process.

FIG. 1 is a schematic block diagram illustrating the construction of an RF direct conversion transmitter.

As illustrated in FIG. 1, the RF direct conversion transmitter includes a digital-to-analog converter 10, a baseband analog filter 20, a phase conversion element 60, a mixer 30, a drive amplifier 40, and a balloon 50. Specifically, a single or a pair of digital-to-analog converters 10, baseband analog filters 20, and mixers 30 may be provided accordingly as the direct conversion transmitter refers to a scalar or a vector, and each pair may be arranged in parallel. FIG. 1 illustrates the construction of a direct conversion transmitter that refers to a vector.

Referring to FIG. 1, a pair of digital-to-analog converters 10 are arranged in parallel, receive digital signals, i.e., I signal and Q signal, and convert them into analog signals, respectively.

A pair of baseband analog filters 20 are also arranged in parallel, perform filtering of a specific band of the I signal and the Q signal which passed through the digital-to-analog converters 10, and pass only baseband signals.

The phase conversion element 60 receives a local oscillation signal from a voltage controlled oscillator (VCO), and outputs an in-phase local oscillation signal and a quadrature phase local oscillation signal to mixers 30.

A pair of mixers 30 arranged in parallel mix the I signal or Q signal provided from the baseband analog filters 20 with an in-phase or quadrature phase local oscillation signal, and outputs an in-phase high frequency vector signal and a quadrature phase high frequency vector signal.

The drive amplifier 40 amplifies high frequency signals output from the respective mixers 30. The balloon 50 converts a balanced signal into an unbalanced signal. A duplexer may be used as the balloon 50.

Accordingly, the transmitter converts the input I signal and Q signal into analog signals, and performs filtering of the converted analog signal into the baseband to thereby output the high frequency vector signal. Then, the transmitter performs an amplifying and unbalancing of the high frequency vector signal and outputs the processed high frequency vector signal to a receiver.

FIG. 2 is a schematic block diagram illustrating the construction of an IF direct conversion transmitter.

As shown in FIG. 2, the intermediate frequency (IF) direct conversion transmitter includes a pair of digital-to-analog converters 110, a pair of analog filters 120, a phase conversion element 160, a pair of mixers 130, an up-mixer 170, a drive amplifier 140, and a balloon 150.

Here, the digital-analog converters 110, the analog filters 120, the phase conversion element 160 and the mixers 130 have the same functions as those described above in the RF direct conversion transmitter. However, it is to be noted that the analog filters 120 perform the filtering of the I signal and the Q signal which passed through the digital-to-analog converters 110 into IF signals, and the mixers 130 mix the I signal or the Q signal provided from the analog filters 120 with a first local oscillation signal L01 having an in-phase or a quadrature phase that is provided from the phase conversion element 160, and outputs an IF in-phase vector signal and an IF quadrature phase vector signal, respectively.

The up-mixer 170 mixes the IF in-phase vector signal and the IF quadrature phase vector signal, which are outputted from the respective mixers 130, with a second high frequency local oscillation signal L02, to output a high frequency in-phase vector signal and a high frequency quadrature phase vector signal, respectively.

FIG. 3 is a circuit diagram illustrating a mixer 30, 130 or 170 that is included in the direct conversion transmitter of FIGS. 1 and 2 and implemented using MOS elements.

As illustrated in FIG. 3, the mixer 30, 130 or 170 includes an amplifying unit 220 and a mixing unit 210. The amplifying unit 220 is composed of a pair of amplifying elements connected in parallel to each other, and amplifies an input signal. The mixing unit 210 includes first switching elements N3 and N4 and second switching elements N5 and N6, which are connected in pairs to be alternately turned on and off. The first and second switching elements N3, N4, N5, and N6 perform the mixing of the input signal with the local oscillation signal LO by being alternately turned on and off to each other, and output a signal corresponding to the difference between the two signals. In the conventional direct conversion transmitter, the amplifying units N1, N2 used in the mixer 30, 130, or 170 are implemented with MOS elements, and the first and second switching elements N3, N4, N5, N6 are also implemented with MOS elements.

However, it is very difficult to implement the conventional RF and IF transmitters as integrated circuits because of the DC offset occurring due to the leakage of the local oscillator and the mismatch between I/Q circuits. Especially, in the case where the direct conversion transmitter is implemented using only the CMOS process, serious problems may occur as follows.

In the case of the direct conversion transmitter, a carrier leakage problem occurs due to the DC offset based on the mismatch between the I/Q signal paths and between differential signals on the I signal path. This leakage problem causes the loss of control of a wide-range gain of the transmitter and the deterioration of an Error Vector Magnitude (EVM) characteristics which lowers the performance of the transmitter.

A bipolar junction transistor (BJT) has an excellent matching characteristic between the elements and a very small DC offset, compared with the MOS element. Accordingly, the direct conversion transmitter in which both the CMOS and BJT elements are integrated using a BiCMOS process has been developed. The DC offset of the direct conversion transmitter that uses the BiCMOS process has been remarkably improved in comparison to that using the MOS process. However, the direct conversion transmitter using the BiCMOS process have drawbacks in that its manufacturing cost is high in comparison to the CMOS process, its development takes a very long time, and it is difficult to implement such BiCMOS process in a single chip since it seriously lowers the performance of the digital circuit in comparison to the transmitter using the CMOS process.

Meanwhile, U.S. Pat. No. 5,498,885 discloses "Modulation circuit" which adopts vertical BJTs to solve the problems occurring when only MOS elements are used. However, since a vertical or lateral BJT has very poor performance of operating frequency in comparison to the MOS, its use is limited to a DC circuit such as a band-gab reference and so on, and various problems such as the lowering of the device matching characteristic have been identified.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention is to provide a transmitter having a vertical bipolar junction transistor (BJT) which can improve a matching characteristic between elements and reduce a DC offset by constructing at least a part of circuit elements with vertical BJTs.

According to an aspect of the present invention, there is provided a transmitter having a vertical bipolar transistor (BJT), which comprises a digital-to-analog converter for converting an input digital signal into an analog signal; a baseband analog filter for filtering a specific band of a signal having passed through the digital-to-analog converter; a phase conversion element for receiving a local oscillation signal and outputting an in-phase local oscillation signal and a quadrature phase local oscillator signal; first and second mixers for mixing signals output from the baseband analog filter with the in-phase local oscillation signal and the quadrature phase local oscillation signal output from the phase conversion element and outputting an in-phase high-frequency vector signal and a quadrature phase high-frequency vector signal; and a drive amplifier for amplifying high frequency signals output from the first and second mixers; wherein a switching element, which constitutes at least one of the digital-to-analog converter, the baseband analog filter, the first and second mixers, and the drive amplifier, is composed of vertical BJTs.

The vertical BJT of the present invention may be implemented by a CMOS process having a deep n-type well. An emitter of the vertical BJT is formed on an n+ source-drain diffusion region according to the CMOS process, a base is formed on a p-type well and a p+ source-drain diffusion region according to the CMOS process, and a collector is formed on the deep n-type well, a n-type well and a n+ source-drain diffusion region according to the CMOS process, Preferably, but not necessarily, at least one of the transistors which constitute the first mixer and the second mixer is implemented with the vertical BJT.

The digital-to-analog converter may be implemented using the MOS transistor implemented by the CMOS process or the vertical BJT implemented by the CMOS process having the deep n-type well.

The baseband analog filter may be implemented using the MOS transistor implemented by the CMOS process or the vertical BJT implemented by the CMOS process having the deep n-type well.

In another aspect of the present invention, there is provided a heterodyne transmitter which comprises a digital-to-analog converter for converting an input digital signal into an analog signal; a baseband analog filter for filtering a specific band of a signal having passed through the digital-to-analog converter; a phase conversion element for receiving a first local oscillation signal and outputting an in-phase local oscillation signal and a quadrature phase local oscillator signal; first and second mixers for mixing signals output from the baseband analog filter with the in-phase local oscillation signal and the quadrature phase local oscillation signal output from the phase conversion element and outputting an in-phase intermediate-frequency (IF) vector signal and a quadrature phase IF vector signal; a third mixer for mixing the IF signals output from the first and second mixers with a second local oscillation signal and outputting high-frequency modulation signals; and a drive amplifier for amplifying the high frequency signals output from the third mixer; wherein the first, second and third mixers are implemented by a CMOS process having a deep n well, and include a switching element implemented with a vertical BJT of which an emitter is formed on an n+ source-drain diffusion region of the CMOS process, a base is formed on a p-type well and a p+ source-drain diffusion region of the CMOS process, and a collector is formed on the deep n-type well and a n+ source-drain diffusion region of the CMOS process. In yet another aspect of the present invention, there is provided a direct conversion transmitter which comprises at least one of a digital-to-analog converter, a baseband analog filter, a mixer, and a drive amplifier, each being implemented by a vertical BJT comprising, a collector comprising a deep n-type well, an n-type well, and an n+ source-drain diffusion region, a base comprising a p-type well and a p+ source-drain diffusion region formed on the n-type well, and an emitter comprising a n+ source-drain diffusion region formed on the p-type well.

In yet another aspect of the present invention, there is provided a direct conversion transmitter comprising at least one of a digital-to-analog converter, a baseband analog filter, a mixer, and a drive amplifier, each being implemented by a vertical BJT comprising, a collector comprising a deep p-type well, a p-type well, and a p+ source-drain diffusion region, a base comprising an n-type well and an n+ source-drain diffusion region formed on the p-type well, and an emitter comprising a p+ source-drain diffusion region formed on the n-type well.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
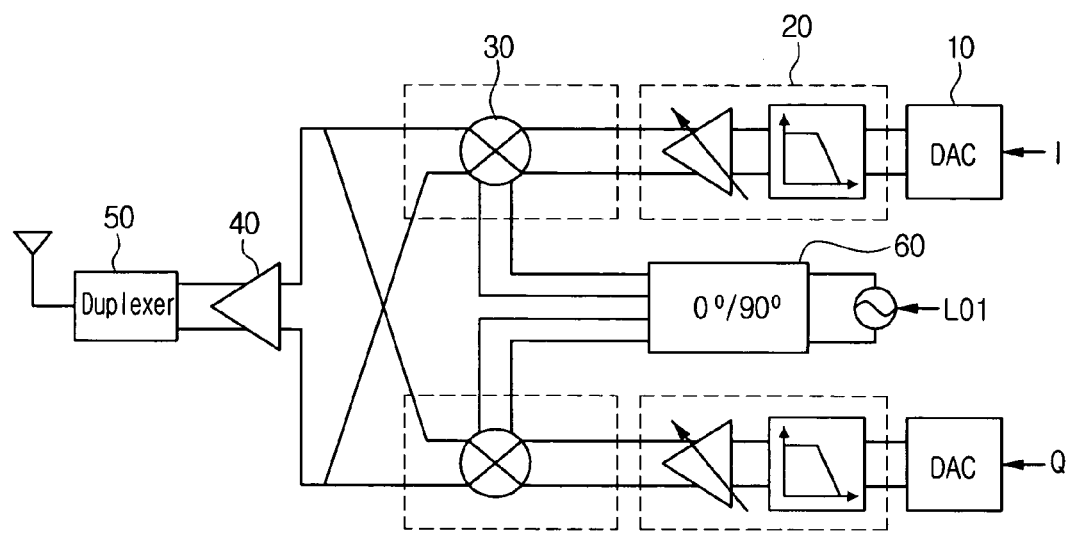
FIG. 1 is schematic block diagram illustrating the constituents of an RF direct conversion transmitter according to an exemplary embodiment of the present invention.
Figure 2:
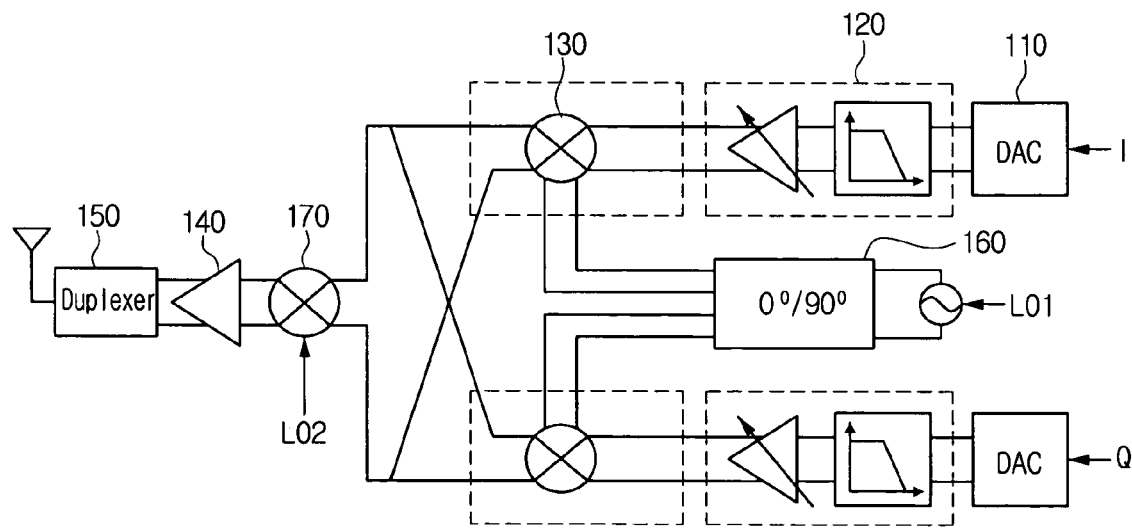
FIG. 2 is schematic block diagram illustrating the constituents of an IF direct conversion transmitter according to an exemplary embodiment of the present invention.
Figure 3:
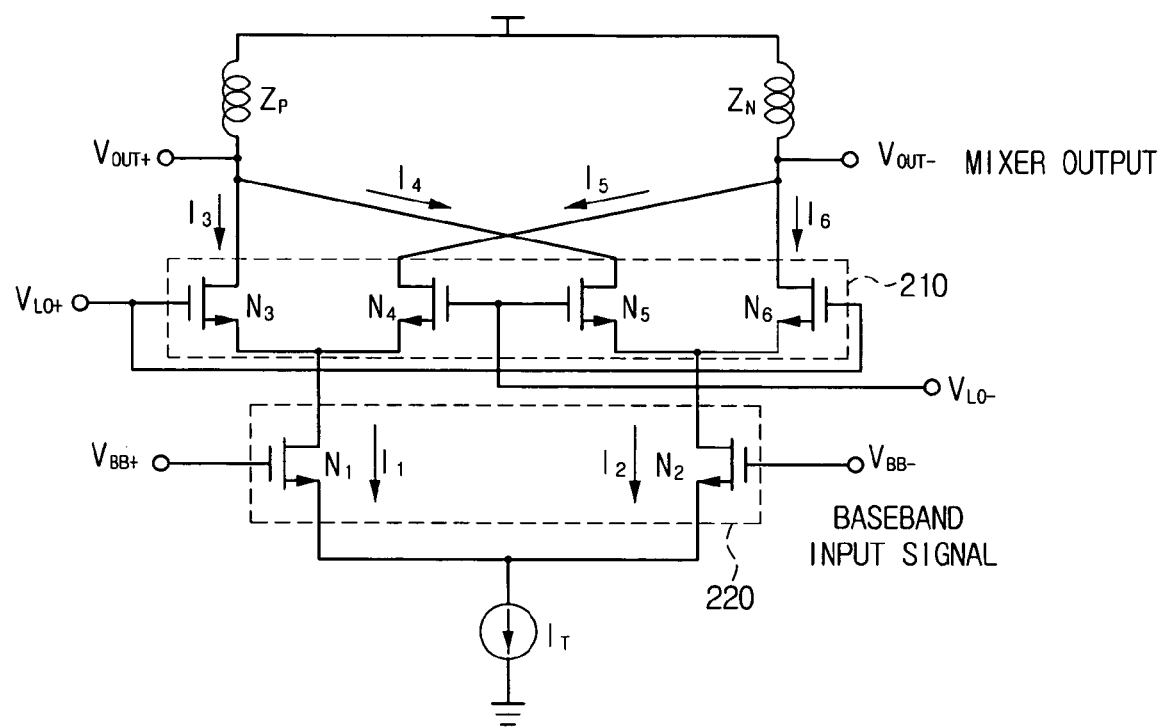
FIG. 3 is a circuit diagram illustrating a mixer which is included in the direct conversion transmitter of FIG. 1 and FIG. 2 and implemented by using a MOS element.

Certain exemplary embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

An RF direct conversion transmitter according to an exemplary embodiment of the present invention includes a digital-to-analog converter, a baseband analog filter, a phase conversion element, a mixer, a drive amplifier, and a balloon. An IF direct conversion transmitter according to the present invention includes a pair of digital-to-analog converters, a pair of baseband analog filters, phase conversion elements, a pair of mixers, an up-mixer, a drive amplifier, and a balloon, in the same way as a conventional transmitter.

Constituent elements of the RF or IF direct conversion transmitter are the same as those of the conventional transmitter. However, among various constituent elements of the RF or IF direct conversion transmitter, at least one of the digital-to-analog converter, the base band analog filter, and the mixer, at least a part of the transistors that constitutes the circuit of the respective elements, is implemented with vertical BJTs, not with MOS elements.

Figure 4:
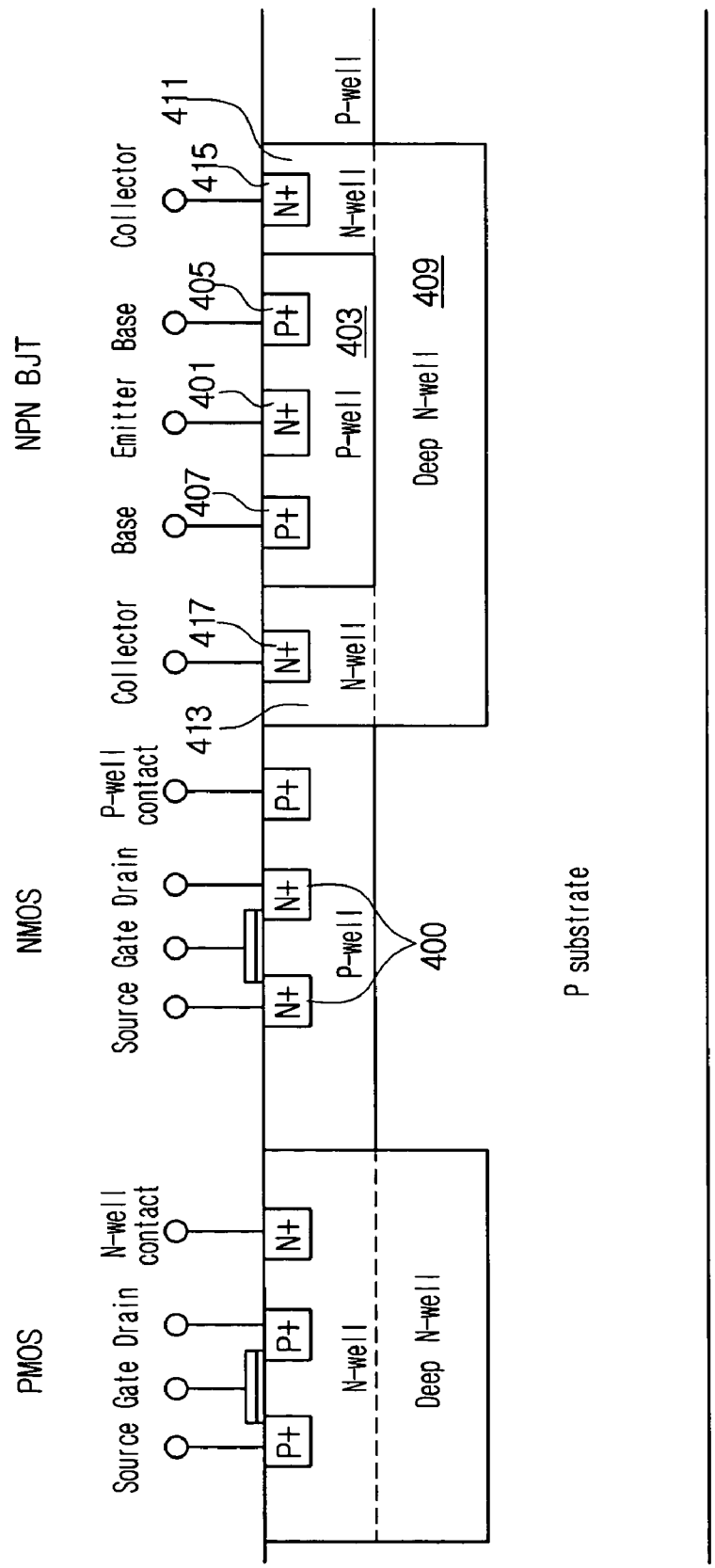
FIG. 4 is a cross sectional view illustrating a PMOS transmitter, a NMOS transmitter and a deep n-type well vertical NPN BJT, which are implemented by a standard triplex well CMOS process.

FIG. 4 is a cross sectional view illustrating a P-channel metal oxide semiconductor (PMOS) transmitter, an N-channel metal oxide semiconductor (NMOS) transmitter and a deep n-type well vertical NPN BJT, which are implemented by a standard triplex well CMOS process.

The PMOS transistor, the NMOS transistor, and the vertical BJT may be implemented by a standard triplex-well CMOS process. Since the respective elements of the IF and RF direct conversion transmitter are constituted using vertical BJTs, only the vertical BJTs will be explained.

Referring to FIG. 4, a superior vertical BJT may be implemented by the triplex well CMOS process. An emitter of the vertical BJT is formed on an n+ source-drain diffusion region 400 of the CMOS process, its base is formed on a p-type well 403 and p+ contacts 405 and 407, and its collector is formed on a deep n-type well 409, n-type wells 411 and 413, and n+ source-drain diffusion region 415 and 417.

The vertical BJT which is formed using the deep n-type well may have not only high frequency performance to the extent that a circuit having a bandwidth of several GHz may be sufficiently used, but also be applied to a high-speed integrated circuit by isolation between elements. Also, since 1/f noise is smaller than the MOS transistor due to a natural characteristic of the BJT and a matching characteristic between the elements is also good, the vertical BJT is useful for a circuit for processing various analog signals. The more the concentration of the deep n-type well 409 is high, the depth of the p-type well 403 is shallow, and a design rule of the CMOS is a little, the more the performance of the vertical BJT is advanced.

Figure 5:
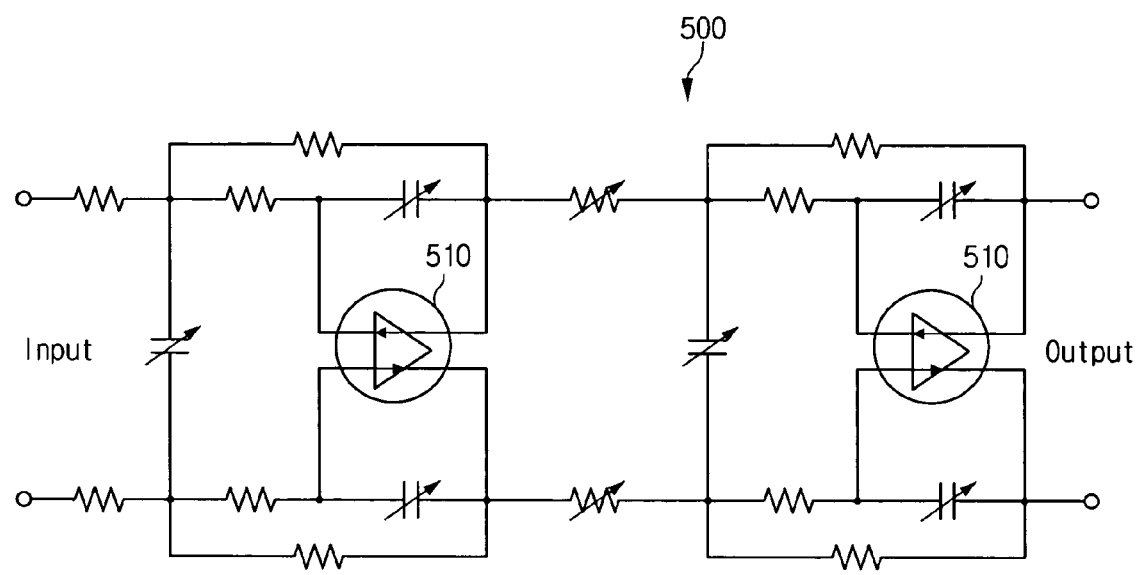
FIG. 5 is a circuit diagram illustrating a conventional analog filter.
Figure 6:
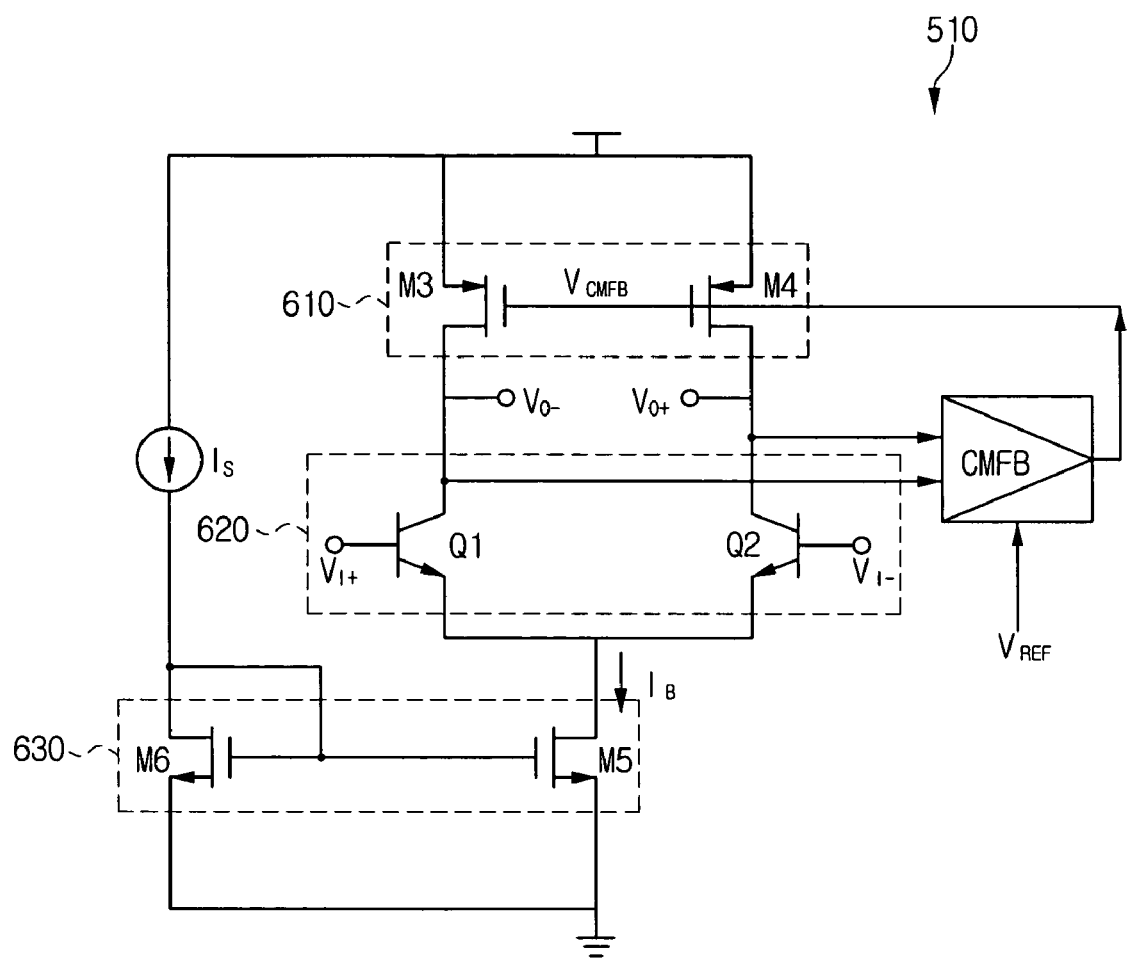
FIG. 6 is a circuit diagram illustrating the conventional analog filter of FIG. 5 where an amplifier provided therewith is implemented with vertical BJTs.

FIG. 5 is a circuit diagram illustrating a conventional analog filter, and FIG. 6 is a circuit diagram illustrating the conventional analog filter of FIG. 5 which an amplifier provided therewith is implemented with a vertical BJTs.

Referring to FIG. 5, an analog filter 500 may include a plurality of resistors, a plurality of variable resistors, a plurality of variable capacitors, and two operational amplifiers 510, and perform the filtering of an input I signal or an input Q signal. In the analog filter 500, a component to which the vertical BJT can be applied is an operational amplifier 510.

As illustrated in FIG. 6, the operational amplifier 510 includes a pair of active load elements (M3, M4) 610 connected in parallel with each other, a pair of amplifying elements (Q1, Q2) 620, a pair of current elements (M5, M6) 630 that apply an electric current to the respective amplifying elements (Q1, Q2) 620.

The active load elements (M3, M4) 610 may reduce loads on the respective amplifying elements (Q1, Q2) 620, and be implemented with a CMOS element.

Meanwhile, the respective amplifying elements (Q1, Q2) 620 for amplifying the input signals are implemented with vertical BJTs. The vertical BJT is formed by the triplex well CMOS process, as explained with reference to FIG. 4.

The analog filter 500 performs a filtering operation on the input signal in a specific band of the I signal and the Q signal which passed through the digital-to-analog converter. In this case, since the respective amplifying elements (Q1, Q2) 620 of the operational amplifier 510 are implemented with the vertical BJTs, a noise may be reduced, a gain may be increased, and a DC offset may be reduced. Accordingly, a matching between the elements may be improved.

According to the above-described embodiment, not only the respective amplifying units (Q1, Q2) 620 may be implemented with the vertical BJTs, but the active loading element (M3, M4) 610 and a current element (M5, M6) 630 may also be implemented with the vertical BJTs.

Figure 7:
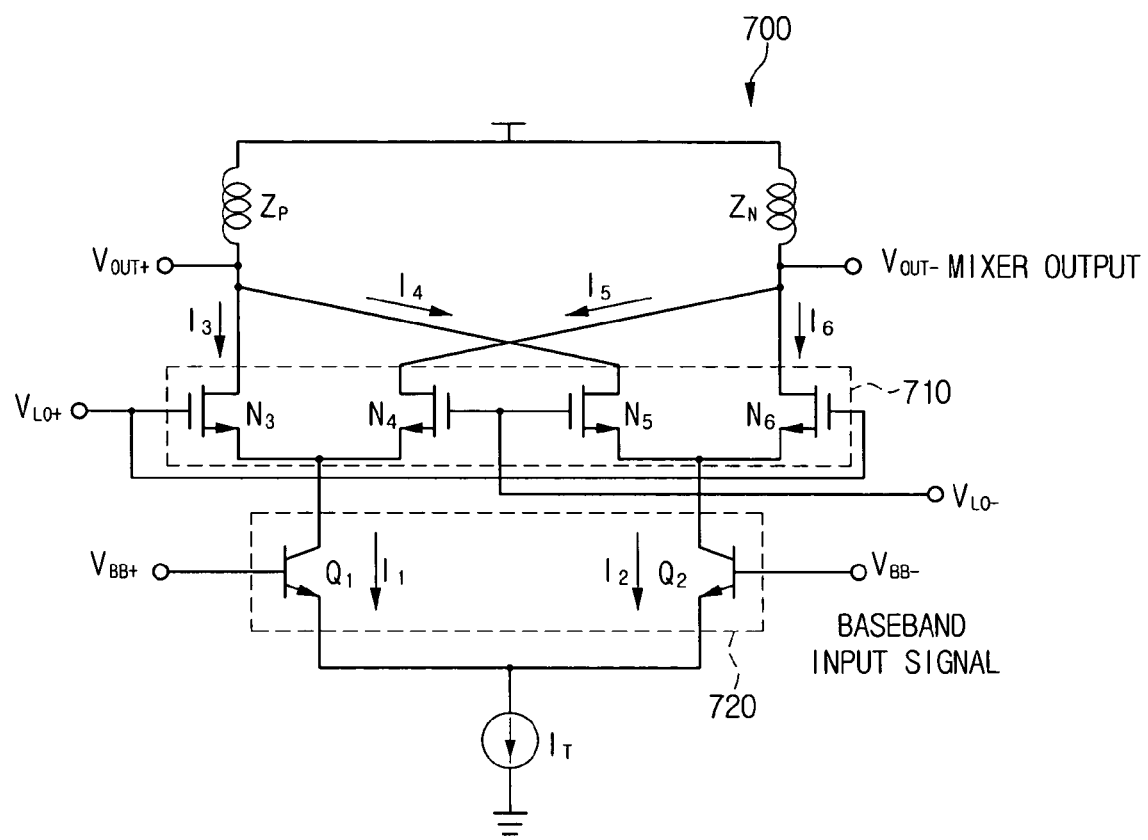
FIG. 7 is a circuit diagram illustrating a mixer which is implemented with vertical BJTs according to a first embodiment of the present invention.
Figure 8:
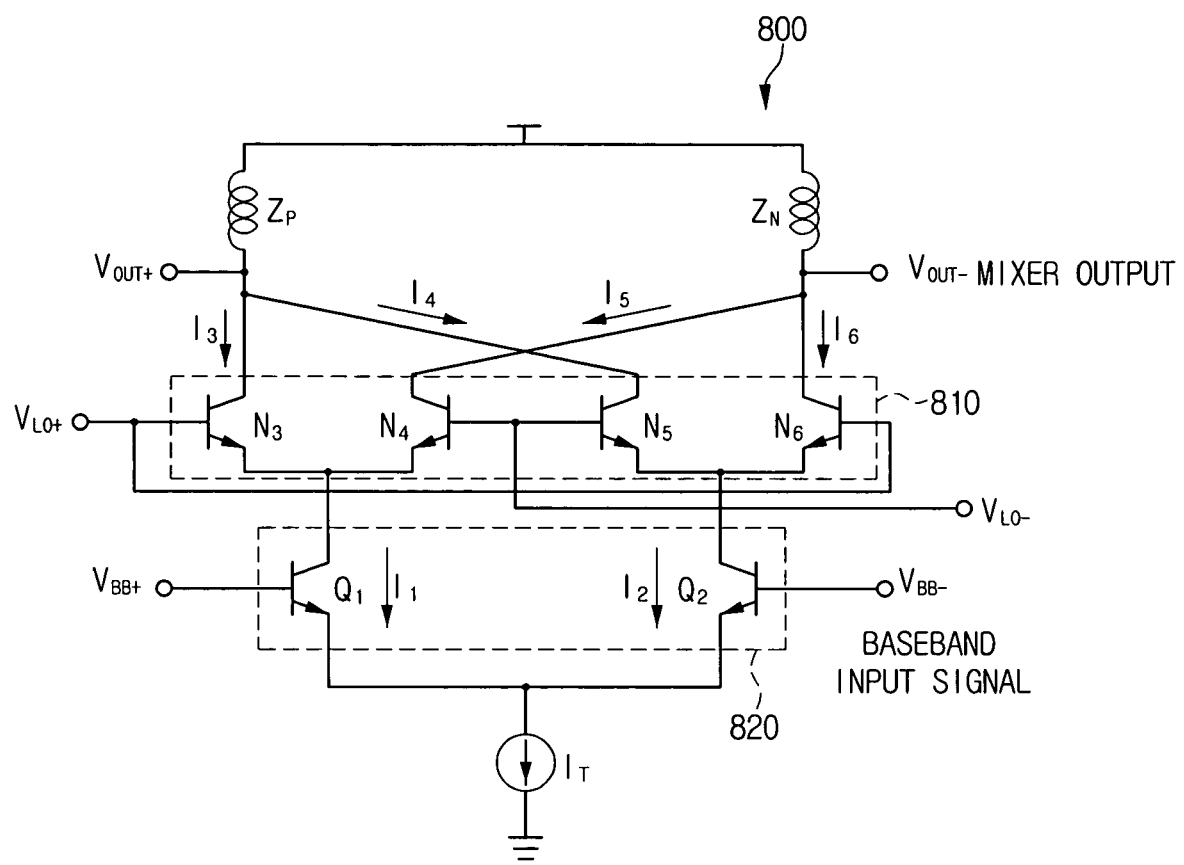
FIG. 8 is a circuit diagram illustrating a mixer which is implemented with vertical BJTs according to a second embodiment of the present invention.
Figure 9:
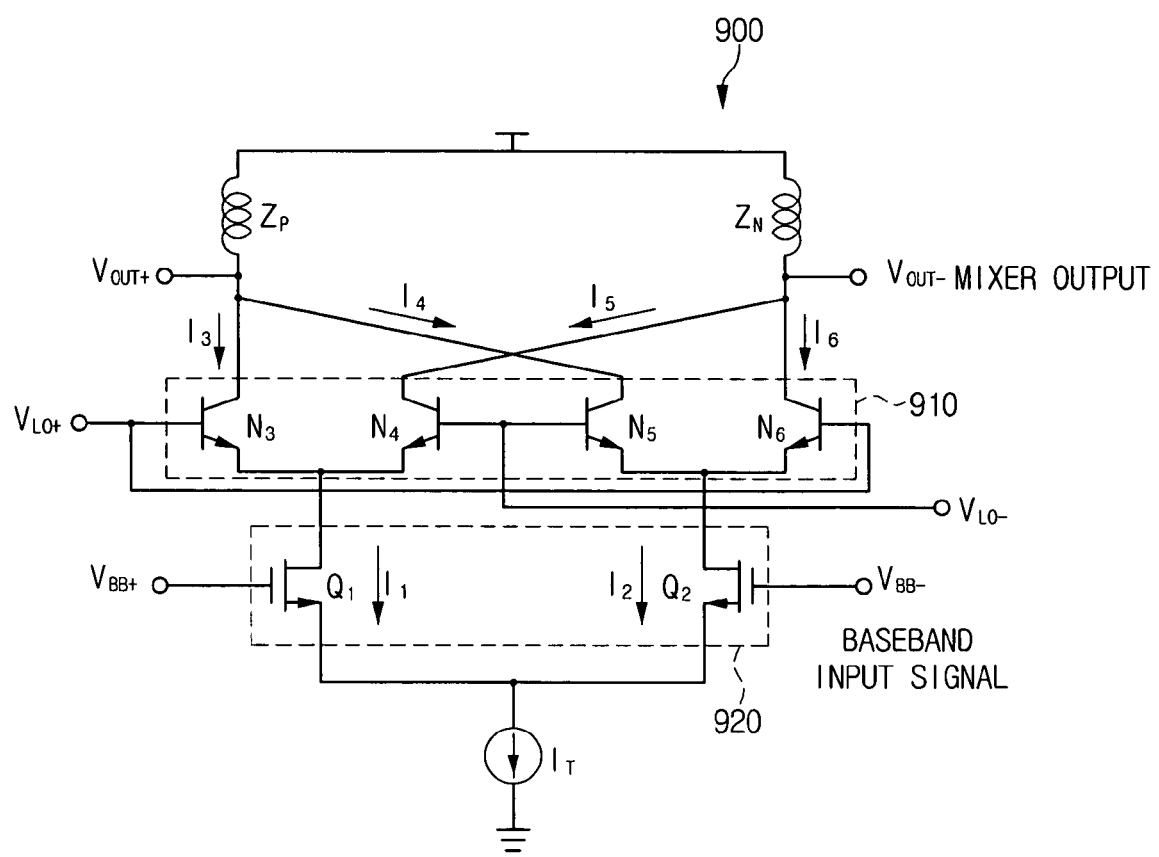
FIG. 9 is a circuit diagram illustrating a mixer which is implemented with vertical BJTs according to a third embodiment of the present invention.

The mixer of the direct conversion transmitter may be implemented with one of the first to third exemplary embodiments as shown in FIGS. 7 to 9.

All the mixers 700, 800 and 900 are similar in that amplifying units 720, 820 and 920, and mixing units 710, 810 and 910 are respectively included. The amplifying units 720, 820 and 920 are provided with a pair of amplifying elements (Q1, Q2) to amplify the input signal. The mixing units 710, 810 and 910 include first switching elements (N3, N4) and second switching elements (N5, N6). The first switching elements (N3, N4) and the second switching elements (N5, N6) make a pair, respectively. The first switching elements (N3, N4) and the second switching elements (N5, N6) are alternately turned on and off to mix the input signal with the local oscillation signal, and then output signals based on the frequency difference between the signals.

According to the first exemplary embodiment of the present invention, as exemplarily shown in FIG. 7, the mixer 700 is implemented by replacing the respective amplifying elements (Q1, Q2) with the vertical BJTs, and the mixing unit 710 are implemented by replacing the respective first and second switching elements (N3, N4, N5, N6) with the MOS elements. The BJT that is used as the amplifying element are NPN PNP BJTs. The vertical NPN BJT is used in the exemplary embodiment of the present invention. The MOS element which constitutes the first and second switching elements (N3, N4, N5, N6) may be implemented with NMOS transistors or PMOS transistors. It is desirable that the NMOS transistor is used in the CMOS process because the NMOS transistor is the best in performance. According to the first exemplary embodiment, the amplifying elements (Q1, Q2) may not use the NPN BJT but the PNP BJT, and the first and second amplifying elements (N3, N4, N5, N6) may be also implemented with the PMOS transistor.

In a mixer 800 according to the second exemplary embodiment as shown in FIG. 8, both the respective amplifying elements (Q1, Q2) of the amplifying unit 820 and the first and second switching elements (N3, N4, N5, N6) of the mixing unit 810 are implemented by the vertical BJTs, as shown in FIG. 4. The respective vertical BJTs, which are used as the amplifying elements (Q1, Q2) and the first and second switching elements (N3, N4, N5, N6), may use the NPN BJT, but may also use the vertical PNP BJT.

In a mixer 900 according to the third exemplary embodiment as shown in FIG. 9, the respective amplifying elements (Q1, Q2) of a amplifying unit 920 are implemented with the MOS element, while the first and second switching elements (N3, N4, N5, N6) are implemented with the vertical BJTs, as shown in FIG. 4. The MOS element which constitutes the respective amplifying elements (Q1, Q2) may be implemented with a NMOS transistor or a PMOS transistor. It is usually desirable that the NMOS transistor is used in the CMOS process because the NMOS transistor is the best in performance. The BJT amplifying element, which constitutes the first and second switching elements (N3, N4, N5, N6), may use the NPN BJT and the PNP BJT, and the vertical NPN BJT is used in the current exemplary embodiment. On the other hand, the amplifying elements (Q1, Q2) may use PMOS transistor, and the first and second switching elements (N3, N4, N5, N6) may also use the vertical PNP BJTs.

As described above, the direct conversion transmitter includes the analog-to-digital filter 500, the mixer 700, 800 and 900, the digital-to-analog converter, the LPF, the variable gain amplifier (VGA), and the programmable gain amplifier (PGA), which is respectively constituted of the vertical NPN BJTs instead of the conventional transistors. Accordingly, the matching characteristics between the elements are improved, and the DC offset is reduced, thereby improving the overall performance of the transmitter.

According to the above-described embodiments, the analog-to-digital filter 500, the mixers 700, 800 and 900, the digital-to-analog converter, the LPF, the VGA and the PGA are implemented with the vertical BJTs. On the other hand, only one of the analog-to-digital filter, the mixer and the digital-to-analog converter is also implemented with the vertical BJTs.

As described above, according to the exemplary embodiments present invention, the matching characteristics between the elements are improved, and the DC offset is reduced, thereby improving the performance of the transmitter.

The foregoing embodiments and advantages are merely exemplary in nature and are not to be construed as limiting the present invention. The present teaching can be readily applied to other types of apparatuses. Also, the description of the exemplary embodiments of the present invention is intended to be illustrative, and therefore it does not limit the scope of the claims. Alternatives, modifications, and variations will be readily apparent to those skilled in the art.

What is claimed is:

1. A direct conversion transmitter comprising:
   a digital-to-analog converter which converts an input digital signal into an analog signal;
   a baseband analog filter which filters a specific band of the analog signal output from the digital-to-analog converter;
   a phase conversion element which receives a local oscillation signal and outputs an in-phase local oscillation signal and a quadrature phase local oscillator signal;
   first and second mixers which mix signals output from the baseband analog filter with the in-phase local oscillation signal and the quadrature phase local oscillation signal output from the phase conversion element, and output an in-phase high-frequency vector signal and a quadrature phase high-frequency vector signal; and
   a drive amplifier which amplifies high frequency signals output from the first and second mixers;
   wherein at least one of the digital-to-analog converter, the baseband analog filter, the first and second mixers, and the drive amplifier comprises a switching element comprising vertical bipolar junction transistors (BJTs).

2. The direct conversion transmitter as claimed in claim 1, wherein each of the vertical BJTs is implemented by a complementary metal oxide semiconductor (CMOS) process having a deep n-type well, and an emitter of each of the vertical BJTs is formed on an n+ source-drain diffusion region according to the CMOS process, a base of each of the vertical BJTs is formed on a p-type well and a p+ source-drain diffusion region according to the CMOS process, and a collector of each of the vertical BJTs is formed on the deep n-type well, an n-type well and an n+ source-drain diffusion region according to the CMOS process.

3. The direct conversion transmitter as claimed in claim 1, wherein the first mixer and the second mixer comprises the vertical BJTs.

4. The transmitter as claimed in claim 1, wherein the digital-to-analog converter comprises metal oxide semiconductor (MOS) transistors implemented by a complementary metal oxide semiconductor process.

5. The direct conversion transmitter as claimed in claim 1, wherein the digital-to-analog converter comprises the vertical BJTs implemented by a complementary metal oxide semiconductor process having a deep n-type well.

6. The direct conversion transmitter as claimed in claim 1, wherein the baseband analog filter comprises metal oxide semiconductor transistors implemented by a complementary metal oxide semiconductor process.

7. The direct conversion transmitter as claimed in claim 1, wherein the baseband analog filter comprises the vertical BJTs implemented by a complementary metal oxide semiconductor process having a deep n-type well.

8. A heterodyne transmitter comprising:
   a digital-to-analog converter which converts an input digital signal into an analog signal;

a baseband analog filter which filters a specific band of the analog signal output from the digital-to-analog converter;

a phase conversion element which receives a first local oscillation signal and outputs an in-phase local oscillation signal and a quadrature phase local oscillator signal;

first and second mixers which mix signals output from the baseband analog filter with the in-phase local oscillation signal and the quadrature phase local oscillation signal output from the phase conversion element, and output an in-phase intermediate-frequency (IF) vector signal and a quadrature phase IF vector signal;

a third mixer which mixes the IF signals output from the first and second mixers with a second local oscillation signal, and outputs high-frequency modulation signals; and a drive amplifier which amplifies the high frequency modulation signals output from the third mixer;

wherein the first, second and third mixers comprise a switching element with vertical BJTs implemented by a complementary metal oxide semiconductor (CMOS) process having a deep n-type well, an emitter of each of the vertical BJTs is formed on an n+ source-drain diffusion region of the CMOS process, a base of each of the vertical BJTs is formed on a p-type well and a p+ source-drain diffusion region of the CMOS process, and a collector of each of the vertical BJTs is formed on a deep n-type well and an n+ source-drain diffusion region of the CMOS process.

9. The heterodyne transmitter as claimed in claim 8, wherein the digital-to-analog converter comprises metal oxide semiconductor transistors implemented by the CMOS process.

10. The heterodyne transmitter as claimed in claim 8, wherein the digital-to-analog converter comprises the vertical BJTs implemented with the CMOS process having the deep n-type well, an emitter of each of the vertical BJTs is formed on an n+ source-drain diffusion region according to the CMOS process, a base of each of the vertical BJTs is formed on a p-type well and a p+ source-drain diffusion region according to the CMOS process, and a collector of each of the vertical BJTs is formed on a deep n-type well, an n-type well and an n+ source-drain diffusion region according to the CMOS process.

11. The heterodyne transmitter as claimed in claim 8, wherein the baseband analog filter comprises metal oxide semiconductor transistors implemented by the CMOS process.

12. The heterodyne transmitter as claimed in claim 8, wherein the baseband analog filter comprises the vertical BJTs implemented by the CMOS process having the deep n-type well, an emitter of each of the vertical BJTs is formed on an n+ source-drain diffusion region according to the CMOS process, a base of each of the vertical BJTs is formed on a p-type well and a p+ source-drain diffusion region according to the CMOS process, and a collector of each of the vertical BJTs is formed on the deep n-type well, an n-type well and an n+ source-drain diffusion region according to the CMOS process.

* * * * *